United States Patent
Chen

(10) Patent No.: US 9,496,801 B2
(45) Date of Patent: Nov. 15, 2016

(54) POWER CONVERSION DEVICE INCLUDING BIDIRECTIONAL SWITCH HAVING REVERSE-BLOCKING INSULATED GATE BIPOLAR TRANSISTORS

(71) Applicant: FUJI ELECTRIC CO., LTD., Kawasaki-shi (JP)

(72) Inventor: Shuangching Chen, Matsumoto (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 0 days.

(21) Appl. No.: 14/330,397

(22) Filed: Jul. 14, 2014

(65) Prior Publication Data

US 2014/0321181 A1    Oct. 30, 2014

Related U.S. Application Data

(63) Continuation of application No. PCT/JP2013/052318, filed on Feb. 1, 2013.

(30) Foreign Application Priority Data

Mar. 30, 2012  (JP) ................... 2012-081718

(51) Int. Cl.
*H02M 7/5387* (2007.01)
*H02M 7/483* (2007.01)
(Continued)

(52) U.S. Cl.
CPC ............ *H02M 7/483* (2013.01); *H02M 7/487* (2013.01); *H02M 7/5387* (2013.01); *H02M 2003/1555* (2013.01)

(58) Field of Classification Search
CPC ................. H02M 7/487; H02M 7/483; H02M 2003/1555; H02M 7/5387
(Continued)

(56) References Cited

U.S. PATENT DOCUMENTS 8,297,389 B2 * 10/2012 Takizawa ................. 180/65.265
8,766,331 B2 *  7/2014 Okita ............................ 257/273
(Continued)

FOREIGN PATENT DOCUMENTS

CN         102075105 A    5/2011
JP       2004-254376 A    9/2004
(Continued)

OTHER PUBLICATIONS

Extended European Search Report issued in EP13767392.7, mailed Jun. 3, 2015.
(Continued)

*Primary Examiner* — Adolf Berhane
*Assistant Examiner* — Afework Demisse
(74) *Attorney, Agent, or Firm* — Rossi, Kimms & McDowell LLP

(57) ABSTRACT

An increase in leakage current when a reverse voltage is applied to reverse-blocking insulated gate bipolar transistors is suppressed, thus reducing a loss resulting from the leakage current. A power conversion device includes a bidirectional switch formed by connecting two reverse-blocking insulated gate bipolar transistors having reverse breakdown voltage characteristics in reverse parallel. A control circuit is configured so as to output command signals for bringing the gates of the reverse-blocking insulated gate bipolar transistors, to which a reverse voltage is applied, into an on state.

7 Claims, 14 Drawing Sheets

(51) Int. Cl.
*H02M 7/487* (2007.01)
*H02M 3/155* (2006.01)

(58) Field of Classification Search
USPC ....... 363/34, 35, 37, 40, 41, 55, 56.1, 56.02, 363/98, 131, 132
See application file for complete search history.

(56) References Cited

U.S. PATENT DOCUMENTS

| | | |
|---|---|---|
| 2010/0039843 A1 | 2/2010 | Takizawa |
| 2011/0116293 A1* | 5/2011 | Tabata .................. H02M 7/487 363/132 |
| 2011/0157931 A1* | 6/2011 | Sato .......................... 363/56.02 |
| 2011/0227630 A1 | 9/2011 | Shinoda et al. |
| 2011/0242866 A1* | 10/2011 | Takizawa .............. H02M 7/487 363/131 |
| 2011/0292697 A1* | 12/2011 | Alexander ............ H02M 5/275 363/37 |
| 2012/0018777 A1 | 1/2012 | Takizawa |

FOREIGN PATENT DOCUMENTS

| | | |
|---|---|---|
| JP | 2004312796 A | 11/2004 |
| JP | 2006-166582 A | 6/2006 |
| JP | 2007104805 A | 4/2007 |
| JP | 2007-288958 A | 11/2007 |
| JP | 2009060709 A | 3/2009 |
| JP | 2010-035279 A | 2/2010 |
| JP | 2010-081536 A | 4/2010 |
| JP | 2010-288416 A | 12/2010 |
| JP | 2012-029429 A | 2/2012 |

OTHER PUBLICATIONS

Mogstad, "New switching pattern for AC/AC converters with RB-IGBTs for offshore wind parks", Jun. 30, 2008, pp. 1-105, Norwegian University of Science and Technology (NTNU), Trondheim, Norway, XP055191709.

Chinese Office Action issued in counterpart application No. CN201380005485.7, dated Nov. 30, 2015. English translation provided.

* cited by examiner

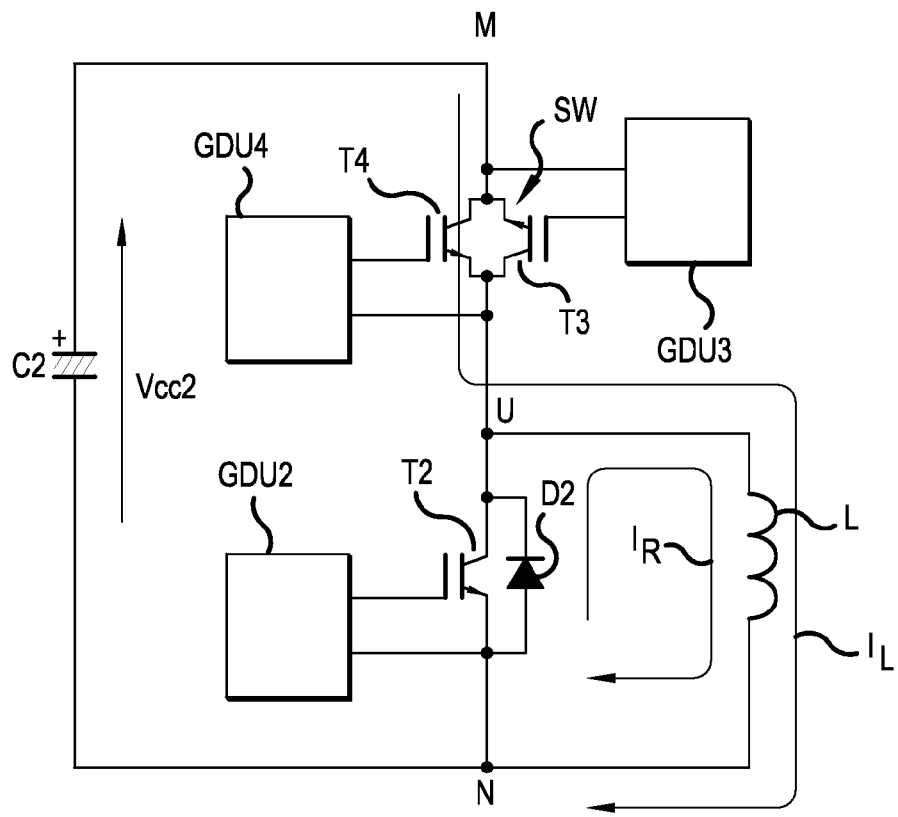
FIG.6
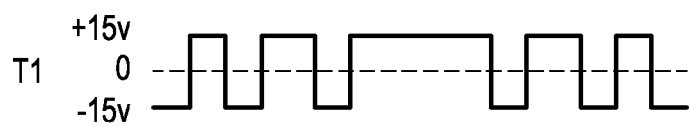
FIG.7A  T1
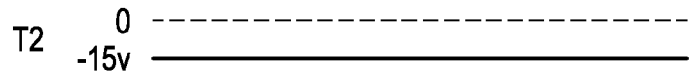
FIG.7B  T2
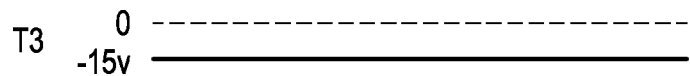
FIG.7C  T3
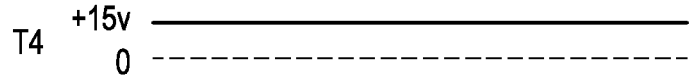
FIG.7D  T4

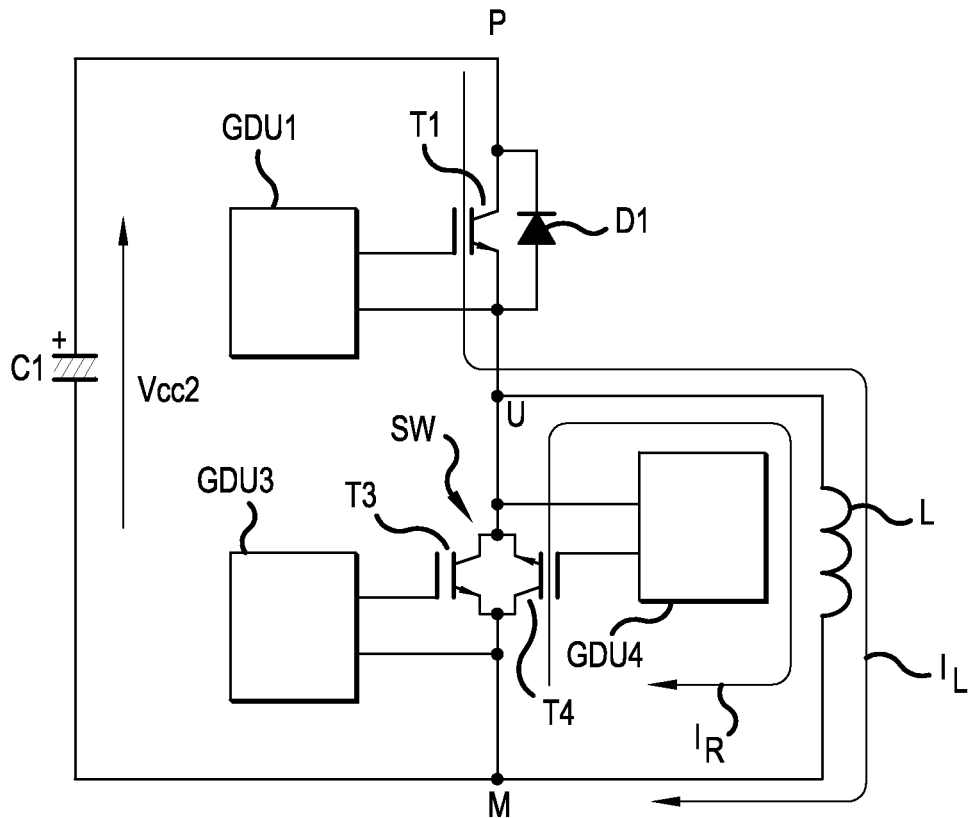
FIG.8
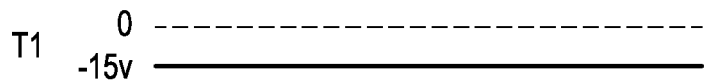
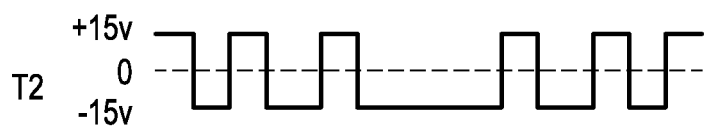
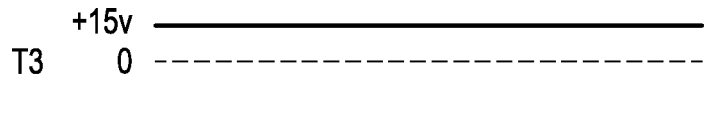
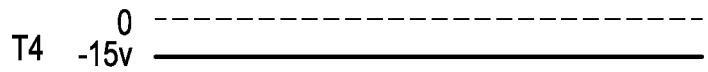

POWER CONVERSION DEVICE INCLUDING BIDIRECTIONAL SWITCH HAVING REVERSE-BLOCKING INSULATED GATE BIPOLAR TRANSISTORS

CROSS-REFERENCE TO RELATED APPLICATIONS

This application is a continuation of International Application No. PCT/JP2013/052318, filed on Feb. 1, 2013, which is based on and claims priority to Japanese Patent Application No. JP 2012-081718, filed on Mar. 30, 2012. The disclosure of the Japanese priority application and the PCT application in their entirety, including the drawings, claims, and the specification thereof, are incorporated herein by reference.

BACKGROUND

1. Field of the Invention

Embodiments of the present invention relate to a power conversion device using a bidirectional switch formed by connecting reverse-blocking insulated gate bipolar transistors in reverse parallel.

2. Description of the Background

A bidirectional switch formed by connecting reverse-blocking insulated gate bipolar transistors (RB-IGBTs) in reverse parallel, as it has low loss characteristics, is put to practical use in a power conversion device such as an inverter or a converter, as for example, shown in Japanese Patent documents JP-A-2007-288958 and JP-A-2012-029429.

The reverse-blocking insulated gate bipolar transistor is such that the size of leakage current when an on signal is given to the gate in a condition in which a reverse voltage is applied between the collector and emitter differs from the size of leakage current when an off signal is given to the gate in the same condition, and the latter is larger. An increase in the leakage current when the reverse voltage is applied causes an increase in loss. Further, the increase in loss leads to a decrease in the reliability of the reverse-blocking insulated gate bipolar transistor and a reduction in the conversion efficiency of the power conversion device.

SUMMARY OF THE INVENTION

Embodiments of the invention provide a power conversion device wherein it is possible to suppress an increase in leakage current when a reverse voltage is applied, and thus reduce a loss resulting from the leakage current.

According to an embodiment of the invention, a power conversion device includes a bidirectional switch formed by connecting two reverse-blocking insulated gate bipolar transistors, having reverse breakdown voltage characteristics, in reverse parallel, wherein a configuration is such that gate drive signals generated based on command signals output from a control circuit are given one to each of the reverse-blocking insulated gate bipolar transistors, and in order to solve the previously described problem, the control circuit is configured so as to output, as the command signals, command signals for bringing the gates of the reverse-blocking insulated gate bipolar transistors, to which a reverse voltage is applied, into an on state.

In an embodiment which carries out three or more levels of power conversions, one phase leg of power conversion circuit is configured so as to include a direct current power source having a positive electrode, middle electrode, and negative electrode; a first semiconductor switch element to which a diode is connected in reverse parallel, and the collector of which is connected to the positive electrode of the direct current power source; a second semiconductor switch element to which a diode is connected in reverse parallel, and the emitter of which is connected to the negative electrode of the direct current power source; and the bidirectional switch, one end of which is connected to the connection point of the emitter of the first semiconductor switch element and the collector of the second semiconductor switch element, and the other end of which is connected to the middle electrode of the direct current power source.

It is possible to apply, for example, an insulated gate bipolar transistor to the first and second semiconductor switch elements.

In another embodiment, one phase leg of power conversion circuit is configured so as to include a direct current power source; a first pair of the bidirectional switches connected in series between the positive electrode and negative electrode of the direct current power source; and a second pair of the bidirectional switches connected in series between the positive electrode and negative electrode of the direct current power source.

In still another embodiment, the bidirectional switches are connected so as to configure a matrix converter.

BRIEF DESCRIPTION OF DRAWINGS

FIG. 6 is a diagram showing a path of a current flowing through the load based on the gate signals of FIG. 5.

FIGS. 7A, 7B, 7C, and 7D show examples of gate drive signals in a switching mode C.

FIG. 8 is a diagram showing a path of a current flowing through the load based on the gate signals of FIG. 7.

FIGS. 9A, 9B, 9C, and 9D show other examples of the gate drive signals in the switching mode C.

DESCRIPTION OF THE ILLUSTRATED EMBODIMENTS

Figure 1:
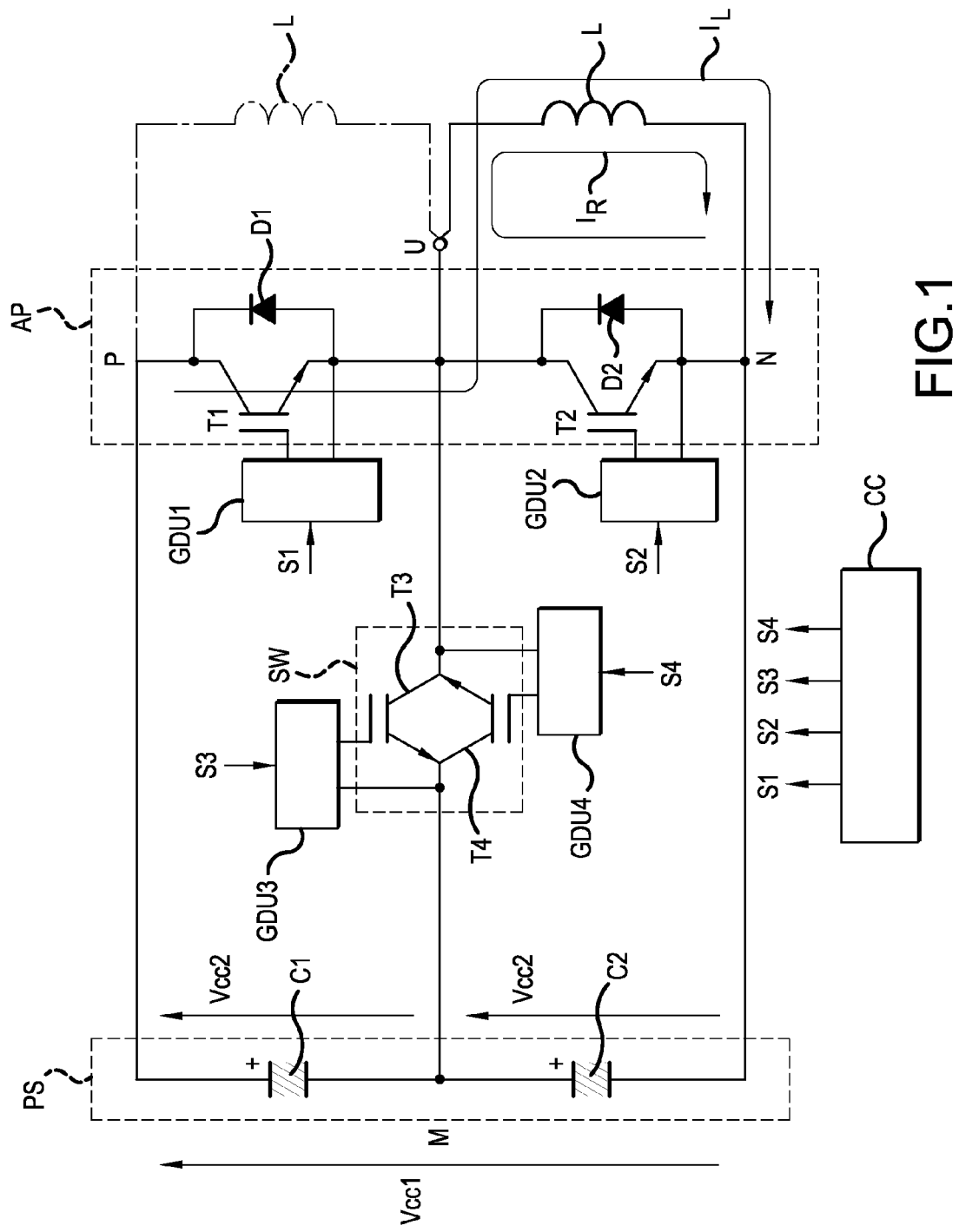
FIG. 1 is a circuit diagram showing a configuration example of a single-phase three-level power conversion device according to the invention.

FIG. 1 is a circuit diagram showing a configuration example of a single-phase three-level power conversion device (inverter) according to an embodiment of the invention. The power conversion device includes a direct current power source PS, an arm pair AP, and a bidirectional switch (alternating current switch) SW.

The power source PS includes capacitors C1 and C2 connected in series. The terminal voltages of the capacitors C1 and C2 are both Vcc2. Consequently, a voltage Vcc1 between the positive electrode and negative electrode of the power source PS is 2×Vcc2.

The arm pair AP includes semiconductor switch elements T1 and T2 connected in series and free wheel diodes D1 and D2 connected in parallel to the respective semiconductor switch elements T1 and T2. In this embodiment, an insulated gate bipolar transistor (IGBT) is used as the semiconductor switch elements T1 and T2, but in place of this, it is also possible to use another semiconductor switch element.

The collector of the upper arm side semiconductor switch element T1 is connected to the positive electrode of the power source PS via a terminal P, and the emitter of the lower arm side semiconductor switch element T2 is connected to the negative electrode of the power source PS via a terminal N. Also, the midpoint of the arm pair AP, which is the connection point of the emitter of the semiconductor switch element T1 and the collector of the semiconductor switch element T2, is connected to an output terminal U.

The bidirectional switch SW, which includes two reverse-blocking insulated gate bipolar transistors T3 and T4 connected in reverse parallel, is connected between the middle electrode of the power source PS connected to a terminal M and the midpoint of the arm pair AP.

Hereafter, the reverse-blocking insulated gate bipolar transistor will be abbreviated to "RB-IGBT."

As is well known, the RB-IGBT differs from a standard IGBT by including reverse breakdown voltage capability. The bidirectional switch SW configured of these kinds of RB-IGBTs has the advantage that there is no need for a diode for blocking a reverse current, because of which no loss due to the diode occurs. The bidirectional switch SW and arm pair AP can be integrated (modularized) together.

Gate drive circuits GDU1 and GDU2 are connected to the gates of the semiconductor switch elements T1 and T2, respectively, and gate drive circuits GDU3 and GDU4 are connected to the gates of the RB-IGBTs T3 and T4, respectively. The gate drive circuits GDU1 to GDU4, based on command signals S1 to S4 output from a control circuit CC, generate corresponding gate drive signals.

Figure 2:
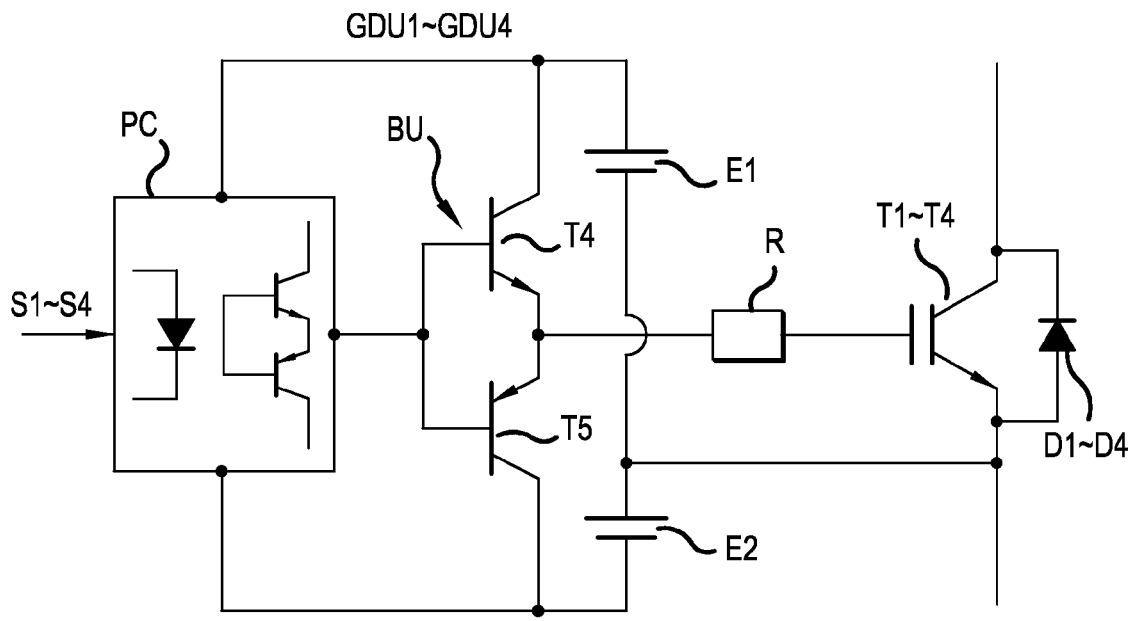
FIG. 2 is a circuit diagram showing a configuration example of a gate drive circuit.

A well-known configuration can be used for the gate drive circuits GDU1 to GDU4, and one example thereof is shown in FIG. 2. The gate drive circuits GDU1 to GDU4 each include a photocoupler PC, a buffer circuit BU formed of transistors T4 and T5, a positive side power source E1, a negative side power source E2, and a resistor R. The command signals S1 to S4 from the control circuit CC shown in FIG. 1 are input one into the photocoupler PC of each respective gate drive circuit GDU1 to GDU4.

The buffer circuit BU of each gate drive circuit GDU1 to GDU4, when each respective command signal S1 to S4 provides a gate on command, outputs a gate drive signal which turns on the gate by the on operation of the transistor T4, and when each respective command signal S1 to S4 provides a gate off command, outputs a gate drive signal which turns off the gate by the on operation of the transistor T5.

The voltage value of the gate drive signal which turns on the gate is substantially equal to the voltage (+15V) of the positive side power source E1, and the voltage value of the gate drive signal which turns off the gate is substantially equal to the output voltage (−15V) of the negative side power source E2.

The RB-IGBTs T3 and T4 configuring the bidirectional switch SW each have the property that a leakage current increases due to hole reinjection from the emitter when a reverse voltage is being applied between the collector and emitter. In order to avoid the leakage current increase, a gate on signal may be applied to the gates of the RB-IGBTs T3 and T4 when the reverse voltage is being applied to the RB-IGBTs T3 and T4. That is, by giving the on signal to the gates, electrons pass through an n+channel and reach the emitters, in other words, there is no more hole reinjection, meaning that the increase in leakage current is suppressed.

The following table shows, by switching mode, the forms of the gate drive signals given to the semiconductor switch elements T1 and T2 and RB-IGBTs T3 and T4. According to the gate drive signals shown in the table, the increase in leakage current of the RB-IGBTs T3 and T4 is suppressed, as will be described hereafter.

In the table, "ON" denotes that the gates are turned on, "OFF" denotes that the gates are turned off, and "SW" denotes that the gates are turned on and off.

TABLE 1

| SW mode | Load L | T1 | T2 | T3 | T4 |
|---------|--------|-----|-----|-----|-----|
| A | U-N | SW | OFF | OFF | OFF |
|   | P-U | OFF | SW | OFF | OFF |
| B | P-U | OFF | OFF | SW | ON |
|   | U-N | OFF | OFF | ON | SW |
| C | M-U | SW | OFF | OFF | ON |
|   | M-U | OFF | SW | ON | OFF |

The power conversion device shown in FIG. 1 operates in the following way by the gate drives shown in the table.

Switching Mode A

Firstly, a description will be given of a case in which a load L is connected between the terminal U and terminal N (refer to the solid line), and the load L is driven by the upper arm side switch element T1. In this case, the control circuit CC outputs a signal S1 providing an "SW" command and signals S2 to S4 providing an "OFF" command. In this case, the signal S1 is a signal formed of a modulated (for example, a pulse-width modulated) pulse train.

In accordance with this, the gate drive circuit GDU1 outputs a gate drive signal which turns on and off the gate of the switch element T1, and the gate drive circuits GDU2, GDU3, and GDU4 output gate drive signals which turn off the gates of the switch element T2, RB-IGBT T3, and RB-IGBT T4, respectively. As a result of this, only the switch element T1 is in on and off operation, and the switch element T2, RB-IGBT T3, and RB-IGBT T4 are in an off state.

When the switch element T1 is in on and off operation, a current $I_L$ flows through the load L in the on period, and a recovery current $I_R$ flows via the free wheel diode D2 in the off period.

Next, a description will be given of a case in which the load L is connected between the terminal P and terminal U (refer to the dashed-dotted line), and the load L is driven by the lower arm side switch element T2. In this case, the control circuit CC outputs signals S1, S3, and S4 providing an "OFF" command and a signal S2 providing an "SW" command.

In accordance with this, only the switch element T2 is in on and off operation, and the switch element T1, RB-IGBT T3, and RB-IGBT T4 are in an off state.

When the switch element T2 is in on and off operation, a load current (not shown) flows in the on period, and a recovery current (not shown) flows through the free wheel diode D1 in the off period.

Switching Mode B

Firstly, a description will be given of a case in which the load L is connected between the terminal P and terminal U, and the load L is driven by the RB-IGBT T3 of the switch SW. In this case, the control circuit CC outputs signals S1 and S2 providing an "OFF" command, a signal S3 providing an "SW" command, and a signal S4 providing an ON command.

Figure 3A:
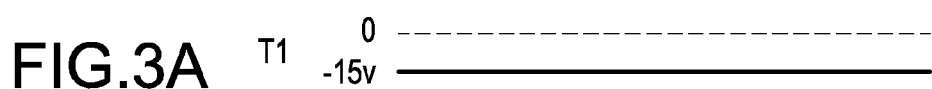
FIGS. 3A, 3B, 3C, and 3D show examples of gate drive signals in a switching mode B.
Figure 3B:
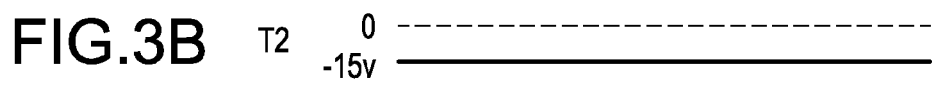
Figure 3C:
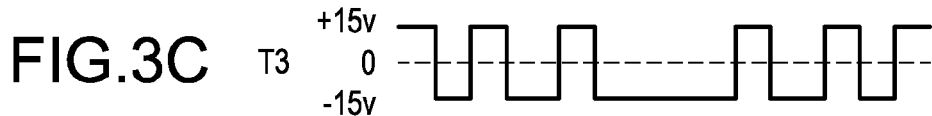
Figure 3D:
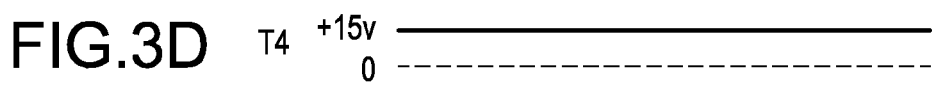

In accordance with this, the gate drive circuits GDU1 and GDU2 respectively output the kinds of gate drive signals shown in FIG. 3A and FIG. 3B, the gate drive circuit GDU3 outputs the kind of gate drive signal illustrated in FIG. 3C, and the gate drive circuit GDU4 outputs the kind of gate drive signal shown in FIG. 3D. As a result of this, the RB-IGBT T3 is in on and off operation, and the switch elements T1 and T2 are both in an off state. At this time, the RB-IGBT T4 is not turned on although being given the gate drive signal which turns on the gate. This is because the terminal voltage Vcc2 of the capacitor C1 is being applied between the collector and emitter of the RB-IGBT T4 via the load L in a reverse direction.

Figure 4:
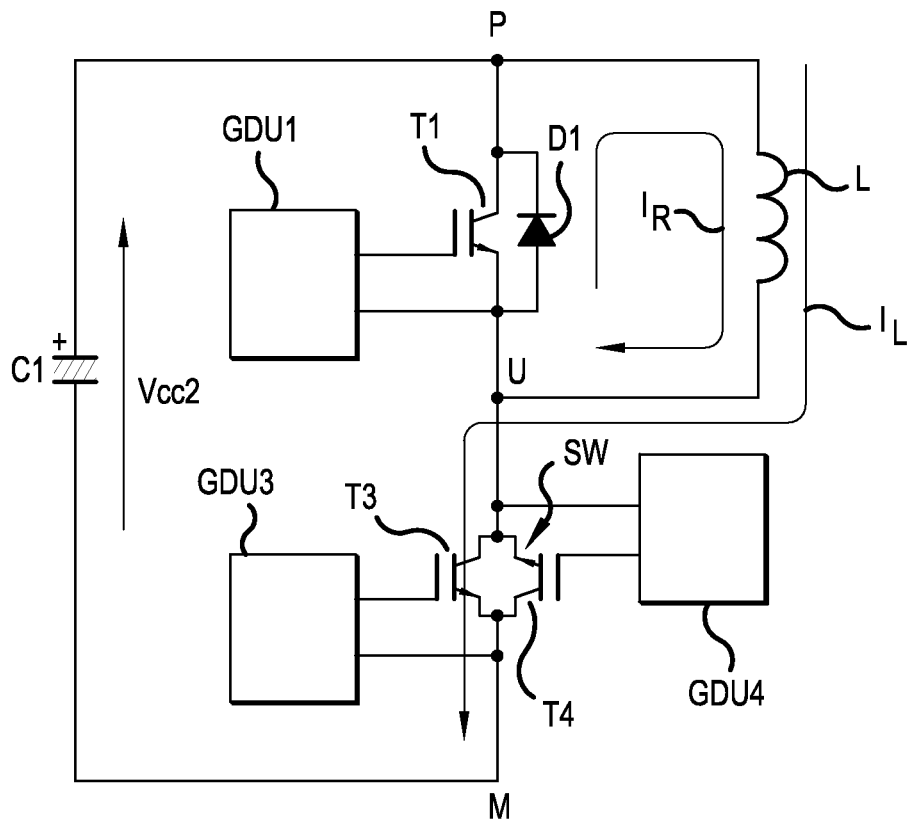
FIG. 4 is a diagram showing a path of a current flowing through a load based on the gate signals of FIG. 3.

The current $I_L$ flows through the load L in the on period of the RB-IGBT T3, as shown in FIG. 4 in which the switch element T2 and capacitor C2 are omitted. The voltage applied between the collector and emitter of the RB-IGBT T3 is not Vcc1 but the terminal voltage Vcc2 (Vcc1/2) of the capacitor C1. The recovery current $I_R$ flows via the free wheel diode D1 in the off period of the RB-IGBT T3.

As the gate drive signal which turns on the gate is input into the RB-IGBT T4 between the collector and emitter of which is applied the reverse voltage Vcc2, as heretofore described, the previously described increase in leakage current due to hole reinjection is suppressed, and a loss due to the leakage current is reduced.

Next, a description will be given of a case in which the load L is connected between the terminal U and terminal N, and the load L is driven by the switch element T4 of the switch SW. In this case, the control circuit CC outputs control signals S1 and S2 providing an "OFF" command, a control signal S3 providing an ON command, and a control signal S4 providing an "SW" command.

Figure 5A:
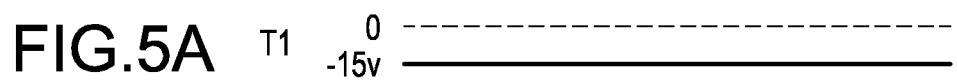
FIGS. 5A, 5B, 5C, and 5D show other examples of the gate drive signals in the switching mode B.
Figure 5B:
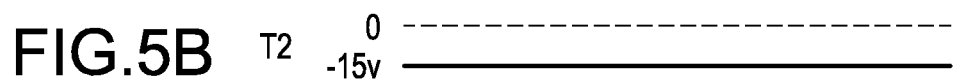
Figure 5C:
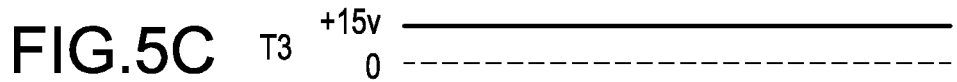
Figure 5D:
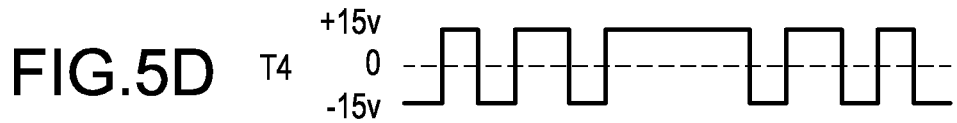

In accordance with this, the gate drive circuits GDU1 and GDU2 respectively output the kinds of gate drive signals shown in FIGS. 5A and 5B, the gate drive circuit GDU3 outputs the kind of gate drive signal shown in FIG. 5C, and the gate drive circuit GDU4 outputs the kind of gate drive signal (a signal wherein the signal shown in FIG. 3C is inverted) shown in FIG. 5D. As a result of this, the RB-IGBT T4 is in on and off operation, and the switch elements T1 and T2 are in an off state. The RB-IGBT T3, as a reverse voltage is being applied between the collector and emitter thereof, is in an off state.

The current $I_L$ flows through the load L in the on period of the RB-IGBT T4, as shown in FIG. 6 in which the switch element T1 and capacitor C1 are omitted, but the size of the load current $I_L$ is also ½ of the previously described load current $I_L$ in the switching mode A. The recovery current $I_R$ flows via the free wheel diode D2 in the off period of the RB-IGBT T4.

As the gate drive signal which turns on the gate is input into the gate of the RB-IGBT T3 between the collector and emitter of which is applied the reverse voltage Vcc2, as previously described, the increase in leakage current due to hole reinjection is suppressed.

Switching Mode C

Firstly, a description will be given of a case in which the load L is connected between the terminal M and terminal U (not shown in FIG. 1), and the load L is driven by the upper arm side switch element T1. In this case, the control circuit CC outputs a signal S1 providing an "SW" command, signals S2 and S3 providing an "OFF" command, and a signal S4 providing an ON command.

In accordance with this, the gate drive circuit GDU1 outputs the kind of gate drive signal shown in FIG. 7A, the GDU2 and GDU3 respectively output the kinds of gate drive signals shown in FIGS. 7B and 7C, and the gate drive circuit GDU4 outputs the kind of gate drive signal shown in FIG. 7D. As a result of this, the switch element T1 is in on and off operation, and the switch element T2 and RB-IGBT T3 are both in an off state.

The current $I_L$ flows through the load L in the on period of the switch element T1, as shown in FIG. 8 in which the switch element T2 and capacitor C2 are omitted, but the size of the load current $I_L$ is ½ of the previously described load current $I_L$ in the switching mode A.

The RB-IGBT T4 is in an off state in the on period of the switch element T1, and causes the recovery current $I_R$ to flow in the off period of the switch element T1. Also, the reverse voltage Vcc2 is applied to the RB-IGBT T4 in the on period of the switch element T1, but at this time, the gate on signal shown in FIG. 7D is input into the RB-IGBT T4, meaning that the previously described increase in leakage current due to hole reinjection is suppressed, and a loss due to the leakage current is reduced.

Next, a description will be given of a case in which the load L is connected between the terminal U and terminal N in the same way as heretofore described, and the load L is driven by the lower arm side switch element T2. In this case, the control circuit CC outputs signals S1 and S4 providing an "OFF" command, a signal S2 providing an "SW" command, and a signal S3 providing an ON command.

In accordance with this, the GDU1 and GDU4 respectively output the kinds of gate drive signals shown in FIGS. 9A and 9D, the gate drive circuit GDU2 outputs the kind of gate drive signal illustrated in FIG. 9B (a signal wherein the signal shown in FIG. 7A is inverted), and the GDU3 outputs the kind of gate drive signal shown in FIG. 9C. As a result of this, the switch element T2 is in on and off operation, and the switch element T1 and RB-IGBT T4 are both in an off state.

Figure 10:
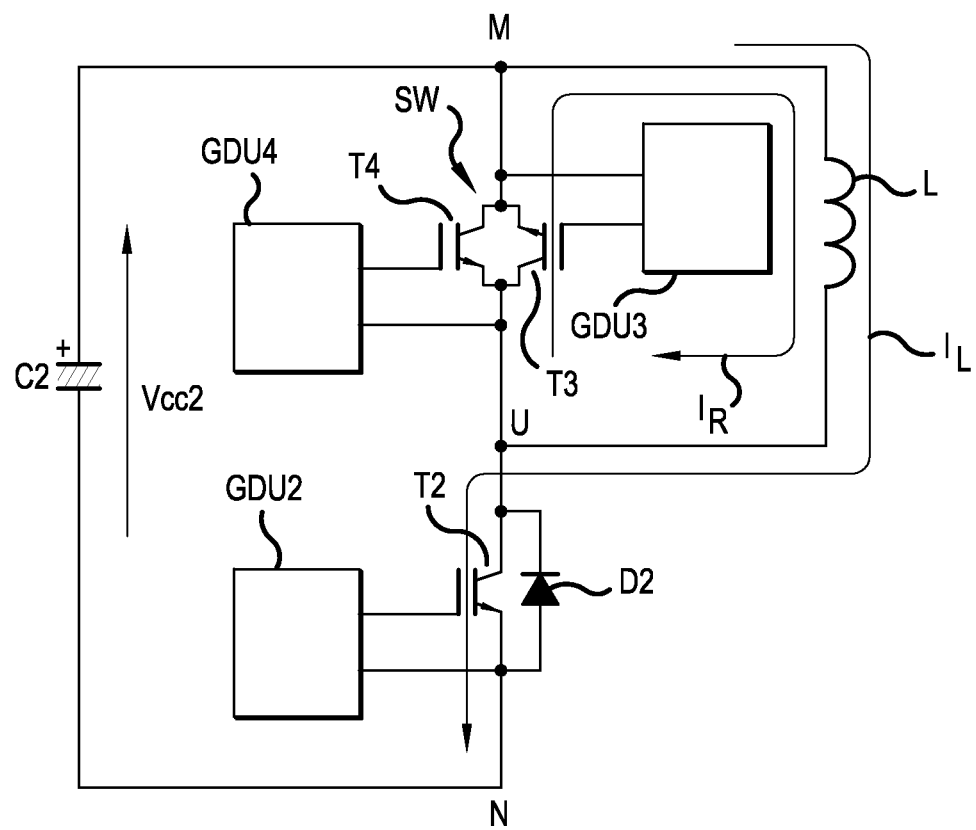
FIG. 10 is a diagram showing a path of a current flowing through the load based on the gate signals of FIG. 9.

The current $I_L$ flows through the load L in the on period of the switch element T2, as shown in FIG. 10 in which the switch element T1 and capacitor C1 are omitted.

The RB-IGBT T3 is in an off state in the on period of the switch element T2, and causes the recovery current $I_R$ to flow in the off period of the switch element T2. Also, the reverse voltage Vcc2 is applied to the RB-IGBT T3 in the on period of the switch element T2, but at this time, the gate on signal shown in FIG. 9C is input into the RB-IGBT T3, meaning that the previously described increase in leakage current due to hole reinjection is suppressed.

As heretofore described, according to the power conversion device according to an embodiment of the invention, when the reverse voltage Vcc2 is applied to the RB-IGBT T3 and RB-IGBT T4 configuring the bidirectional switch SW, the gate drive signals which turn on the gates are input into the RB-IGBT T3 and RB-IGBT T4. Consequently, the increase in leakage current due to hole reinjection is suppressed, and power conversion efficiency is improved.

Figure 11:
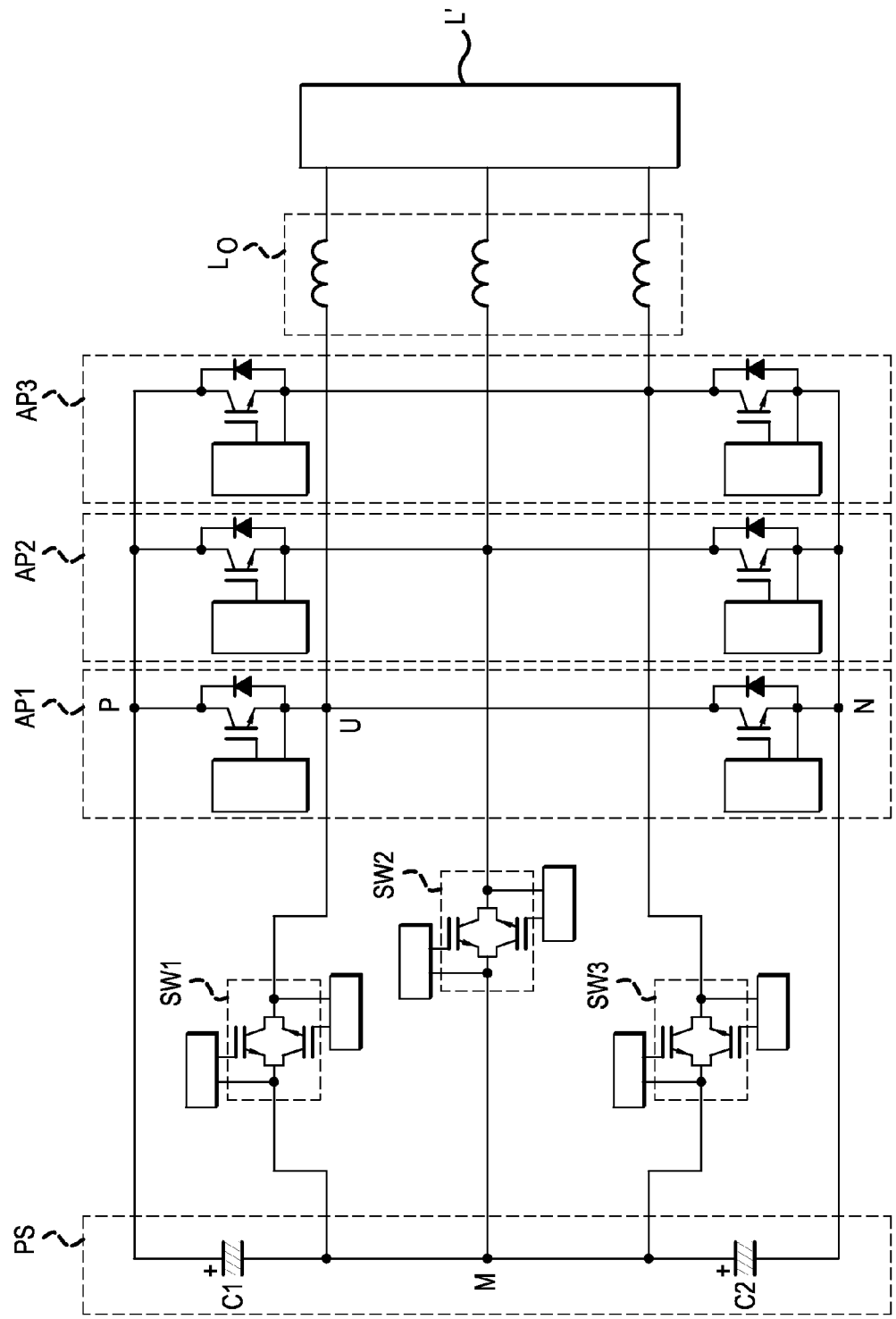
FIG. 11 is a circuit diagram showing a configuration example of a three-phase three-level power conversion device according to the invention.

FIG. 11 shows a three-phase three-level power conversion device including three phases leg of arm pairs AP and bidirectional switches SW shown in FIG. 1. In the power conversion device, arm pairs AP1, AP2, and AP3 have the same configuration as the arm pair AP shown in FIG. 1, and bidirectional switches SW1, SW2, and SW3 have the same configuration as the bidirectional switch SW shown in FIG. 1. The arm pairs AP1, AP2, and AP3 can be integrated (modularized) together with the respective bidirectional switches SW1, SW2, and SW3. Reference sign $L_O$ represents a filter reactor, and reference sign L' represents a three-phase load.

In a power conversion device according to an embodiment the invention, there is a case in which a reverse voltage is applied to RB-IGBTs configuring each bidirectional switch SW1 to SW3. In this case, an unshown control circuit outputs gate drive signals which turn on the gates of the RB-IGBTs to which the reverse voltage is applied. By so doing, an increase in leakage current in the RB-IGBTs is suppressed, and power conversion efficiency is improved.

In both the power conversion device according to the invention and the power conversion shown in FIG. 1, it is possible to obtain three levels of voltage outputs, but in a power conversion device (for example, refer to JP-A-2011-72118) wherein it is possible to obtain a larger number of levels of voltage outputs, it is also possible to improve power conversion efficiency by adopting a configuration wherein the gates of RB-IGBTs to which a reverse voltage is being applied are turned on.

Figure 12:
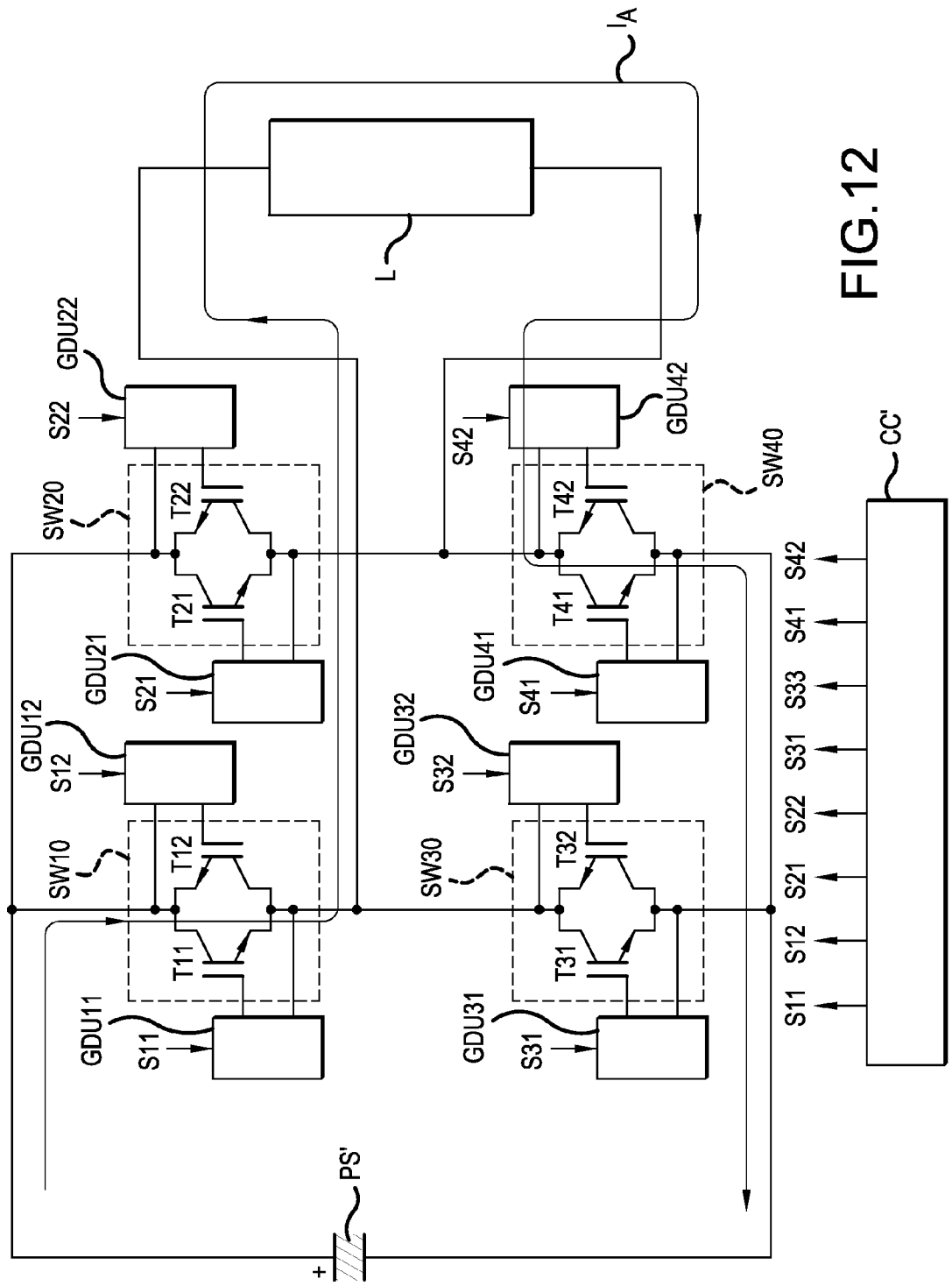
FIG. 12 is a circuit diagram showing a configuration example, and a path of a drive current, of a single-phase two-level power conversion device according to the invention.

FIG. 12 is a circuit diagram showing an embodiment of a single-phase two-level power conversion device (inverter) according to an embodiment the invention. The power conversion device has a configuration wherein a pair of bidirectional switches SW10 and SW30 connected in series and a pair of bidirectional switches SW20 and SW40 connected in series are connected in parallel between the positive electrode and negative electrode of a direct current power source PS' formed of a capacitor, and a single-phase load L is connected between the series connection point of the bidirectional switches SW10 and SW30 and the series connection point of the bidirectional switches SW20 and SW40.

Each pair of RB-IGBT T11 and RB-IGBT T12 configuring the bidirectional switch SW10, RB-IGBT T21 and RB-IGBT T22 configuring the bidirectional switch SW20, RB-IGBT T31 and RB-IGBT T32 configuring the bidirectional switch SW30, and RB-IGBT T41 and RB-IGBT T42 configuring the bidirectional switch SW40, corresponds to the RB-IGBT T1 and RB-IGBT T2 configuring the bidirectional switch SW1 shown in FIG. 1.

Gate drive circuits GDU11 and GDU12 are connected to the respective RB-IGBTs T11 and T12, gate drive circuits GDU21 and GDU22 are connected to the respective RB-IGBTs T21 and T22, gate drive circuits GDU31 and GDU32 are connected to the respective RB-IGBTs T31 and T32, and gate drive circuits GDU41 and GDU42 are connected to the respective RB-IGBTs T41 and T42.

The gate drive circuits of FIG. 12 have the same configuration as the gate drive circuits GDU1 to GDU4 shown in FIG. 2, and command signals from a control circuit CC' are input one into each of the gate drive circuits.

Hereafter, a description will be given of an operation of the power conversion device according to this embodiment of the invention. The control circuit CC' outputs command signals S11, S12, S21, S22, S31, S32, S41, and S42.

Figure 16:
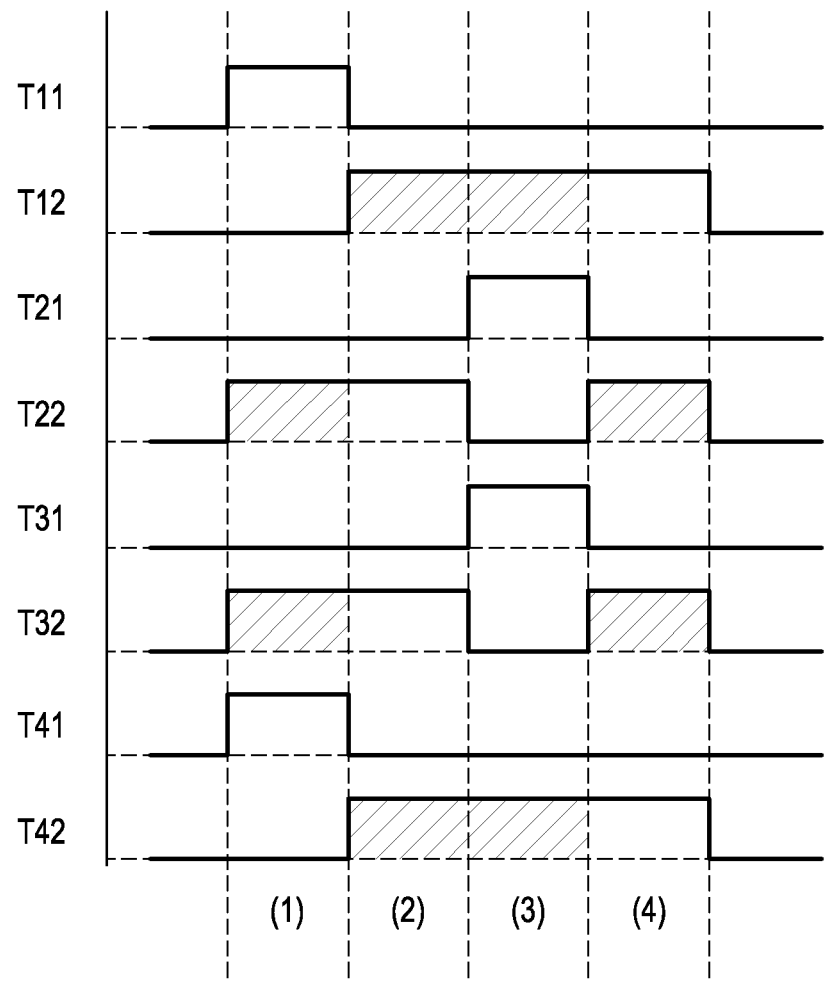
FIG. 16 is a chart showing gate drive signals in the power conversion device of FIG. 12.

That is, the control circuit CC' outputs command signals such as to generate gate drive signals which turn on the gates of the RB-IGBTs T11, T22, T32, and T41, and gate drive signals which turn off the gates of the RB-IGBTs T12, T21, T31, and T42, in the period (1) shown in FIG. 16.

As a result of this, the RB-IGBTs T11 and T41 are turned on, and as well as a load drive current $I_A$ flowing through the path shown in FIG. 12, a reverse voltage is applied between the collectors and emitters of the RB-IGBTs T22 and T32. As the gate drive signals which turn on the gates are input into the RB-IGBTs T22 and T32 to which the reverse voltage is applied, as shown by the hatched lines, an increase in leakage current due to hole reinjection is suppressed.

Next, the control circuit CC' outputs command signals such as to generate gate drive signals which turn on the gates of the RB-IGBTs T12, T22, T32, and T42, and gate drive signals which turn off the gates of the RB-IGBTs T11, T21, T31, and T41, in the period (2) shown in FIG. 16.

Figure 13:
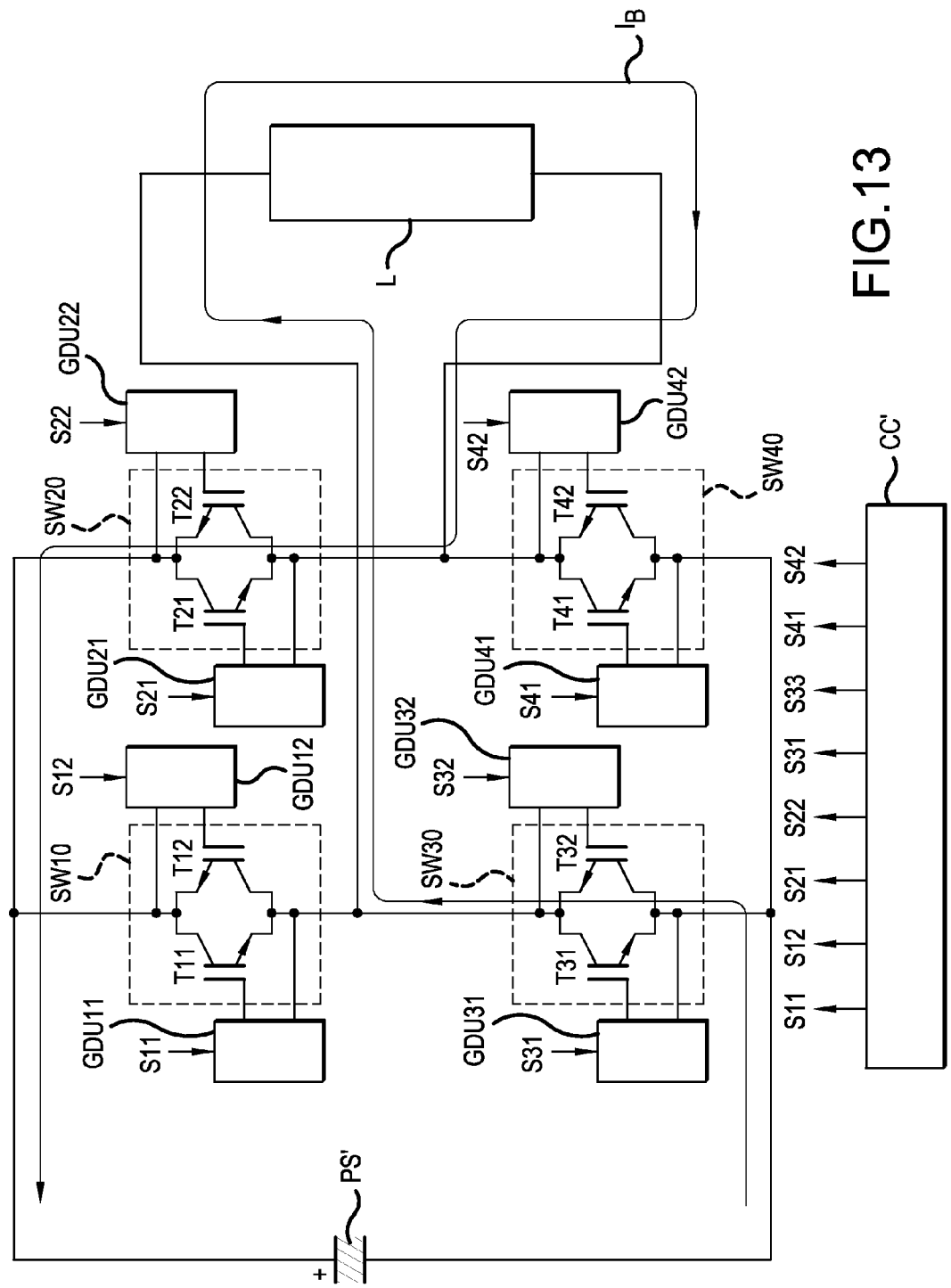
FIG. 13 is a circuit diagram showing a path of a recovery current in the power conversion device of FIG. 12.

As a result of this, the RB-IGBTs T22 and T32 are turned on, and as well as a recovery current $I_B$ flowing through the path shown in FIG. 13, a reverse voltage is applied between the collectors and emitters of the RB-IGBTs T12 and T42. As the gate drive signals which turn on the gates are input into the RB-IGBTs T12 and T42 to which the reverse voltage is applied, as shown in the hatched lines, an increase in leakage current due to hole reinjection is suppressed.

The control circuit CC' outputs command signals such as to generate gate drive signals which turn on the gates of the RB-IGBTs T12, T21, T31, and T42, and gate drive signals which turn off the gates of the RB-IGBTs T11, T22, T32, and T41, in the period (3) shown in FIG. 16.

Figure 14:
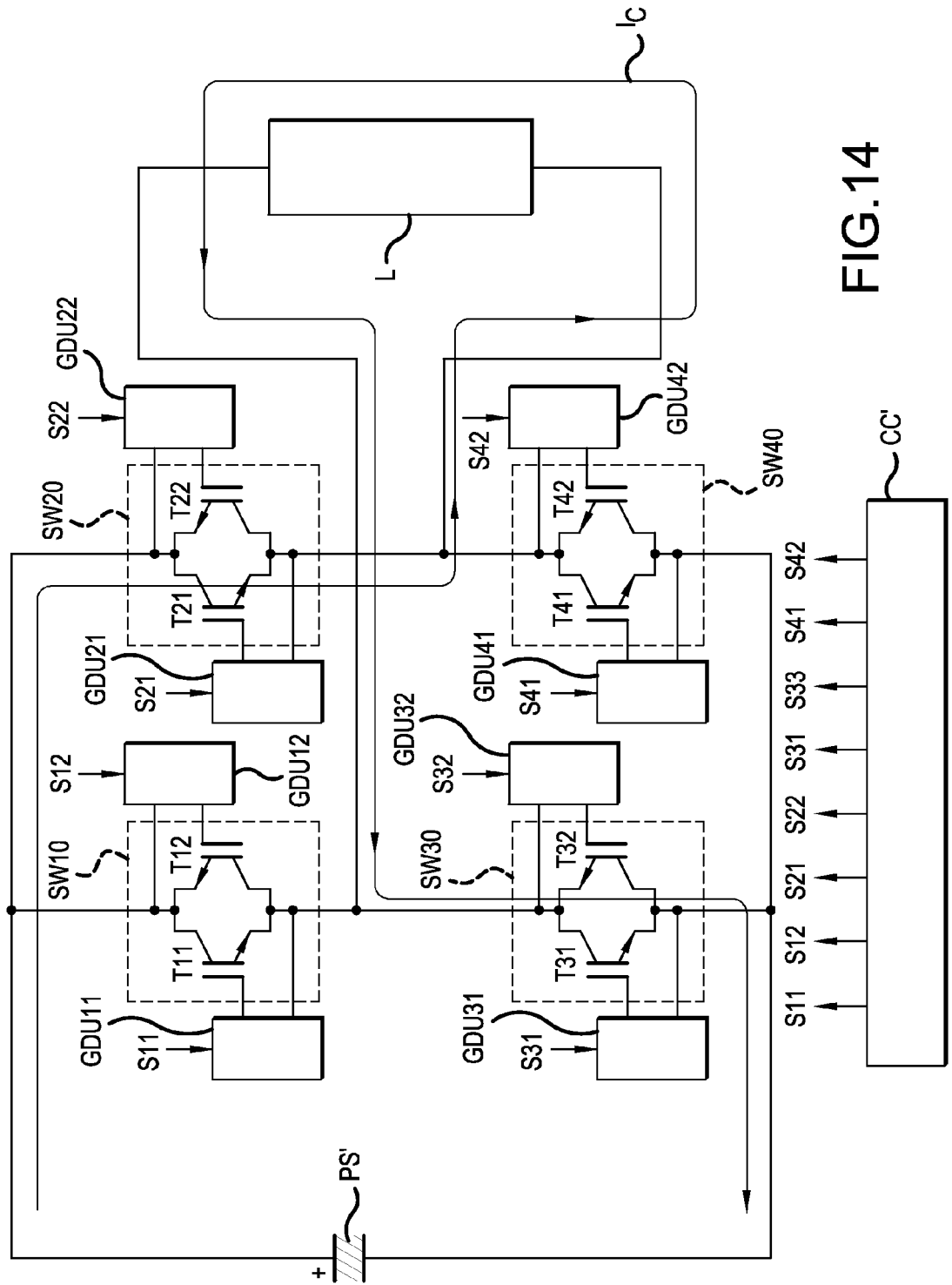
FIG. 14 is a diagram showing another path of the drive current in the power conversion device of FIG. 12.

As a result of this, the RB-IGBTs T21 and T31 are turned on, and as well as a recovery current $I_C$ flowing through the path shown in FIG. 14, a reverse voltage is applied between the collectors and emitters of the RB-IGBTs T12 and T42. As the gate drive signals which turn on the gates are input into the RB-IGBTs T12 and T42 to which the reverse voltage is applied, as shown in the hatched lines, the increase in leakage current due to hole reinjection is suppressed.

Next, the control circuit CC' outputs command signals such as to generate gate drive signals which turn on the gates of the RB-IGBTs T12, T22, T32, and T42, and gate drive signals which turn off the gates of the RB-IGBTs T11, T21, T31, and T41, in the period (4) shown in FIG. 16.

Figure 15:
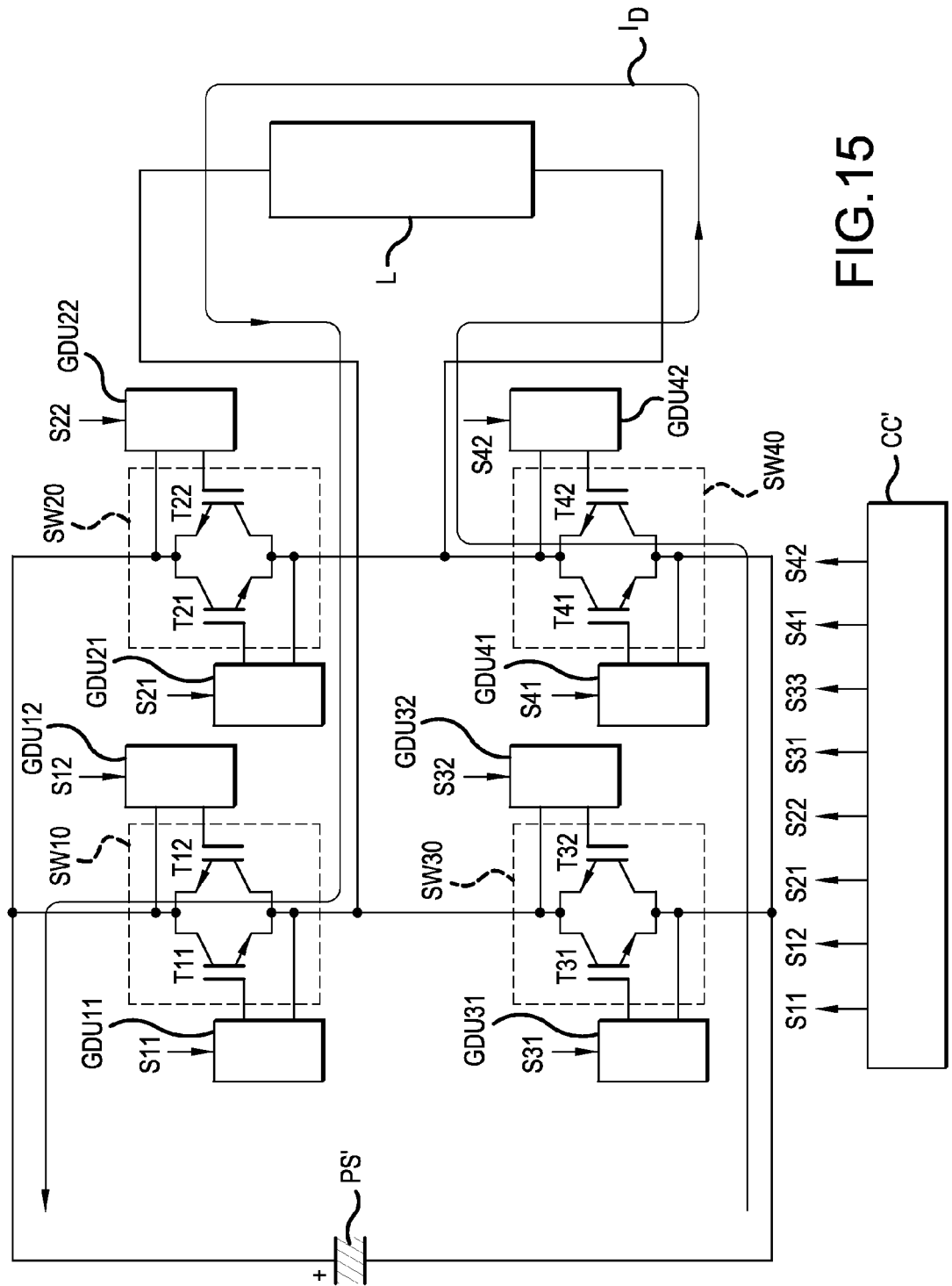
FIG. 15 is a diagram showing another path of the recovery current in the power conversion device of FIG. 12.

As a result of this, the RB-IGBTs T12 and T42 are turned on, and as well as a recovery current $I_D$ flowing through the path shown in FIG. 15, a reverse voltage is applied between the collectors and emitters of the RB-IGBTs T22 and T32. As the gate drive signals which turn on the gates are input into the RB-IGBTs T22 and T32 to which the reverse voltage is applied, as shown in the hatched lines, the increase in leakage current due to hole reinjection is suppressed.

Figure 17:
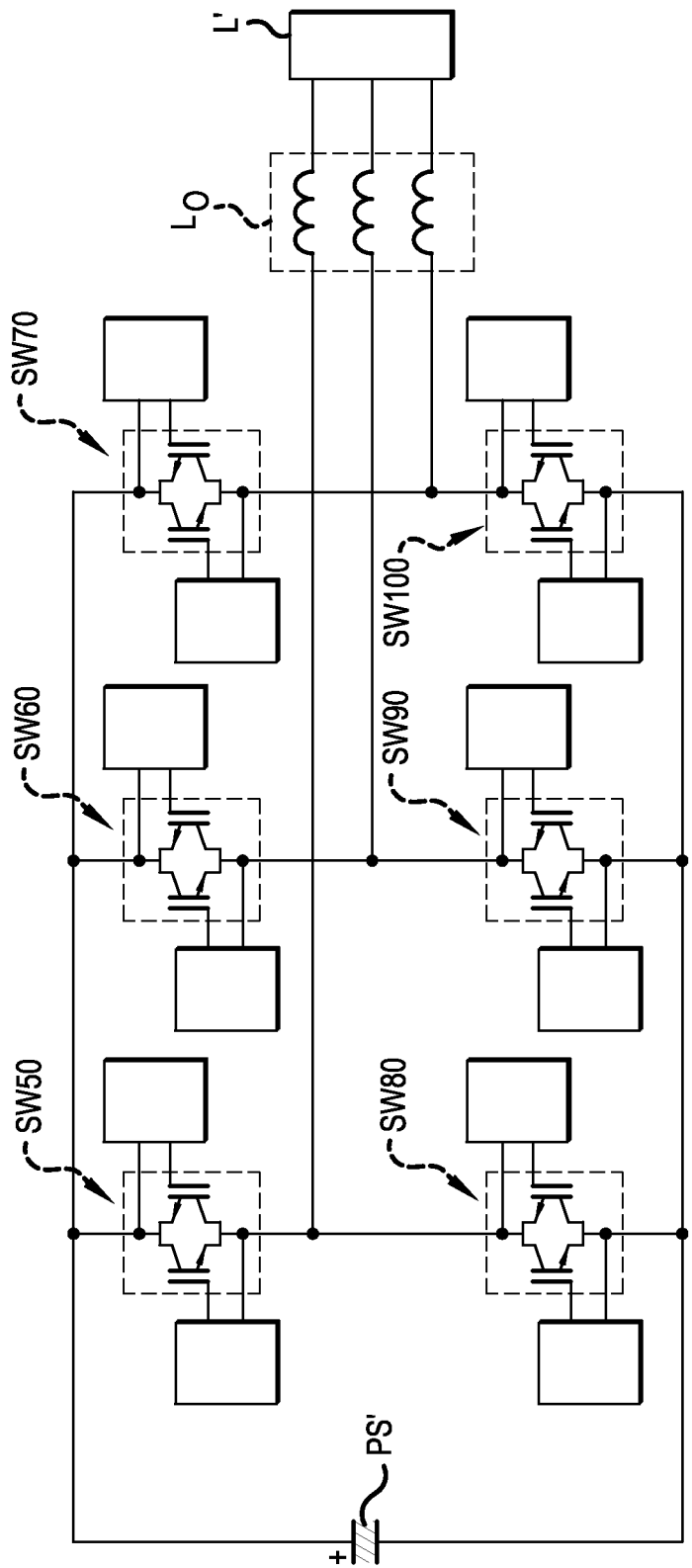
FIG. 17 is a circuit diagram showing a configuration example of a three-phase two-level power conversion device according to the invention.

FIG. 17 is a circuit diagram showing a three-phase two-level power conversion device (inverter) according to an embodiment of the invention. The power conversion device, being such that the power conversion device shown in FIG. 12 is extended to a three-phase use so as to be applied to a three-phase load L', includes a pair of bidirectional switches SW50 and SW80, a pair of bidirectional switches SW60 and SW90, and a pair of bidirectional switches SW70 and SW100, each of which is connected in series between the positive electrode and negative electrode of a direct current source PS'.

There is a case in which a reverse voltage is applied between the collectors and emitters of some of RB-IGBTs configuring the bidirectional switches SW50 to SW100. RB-IGBTs to which the reverse voltage is applied are known in advance from a gate control sequence. Therefore, an unshown control circuit outputs command signals such as to generate gate drive signals which turn on the gates of the RB-IGBTs in order to suppress an increase in leakage current of the RB-IGBTs to which the reverse voltage is applied. By so doing, a loss due to the increase in leakage current of the RB-IGBTs to which the reverse voltage is applied is reduced.

Figure 18:
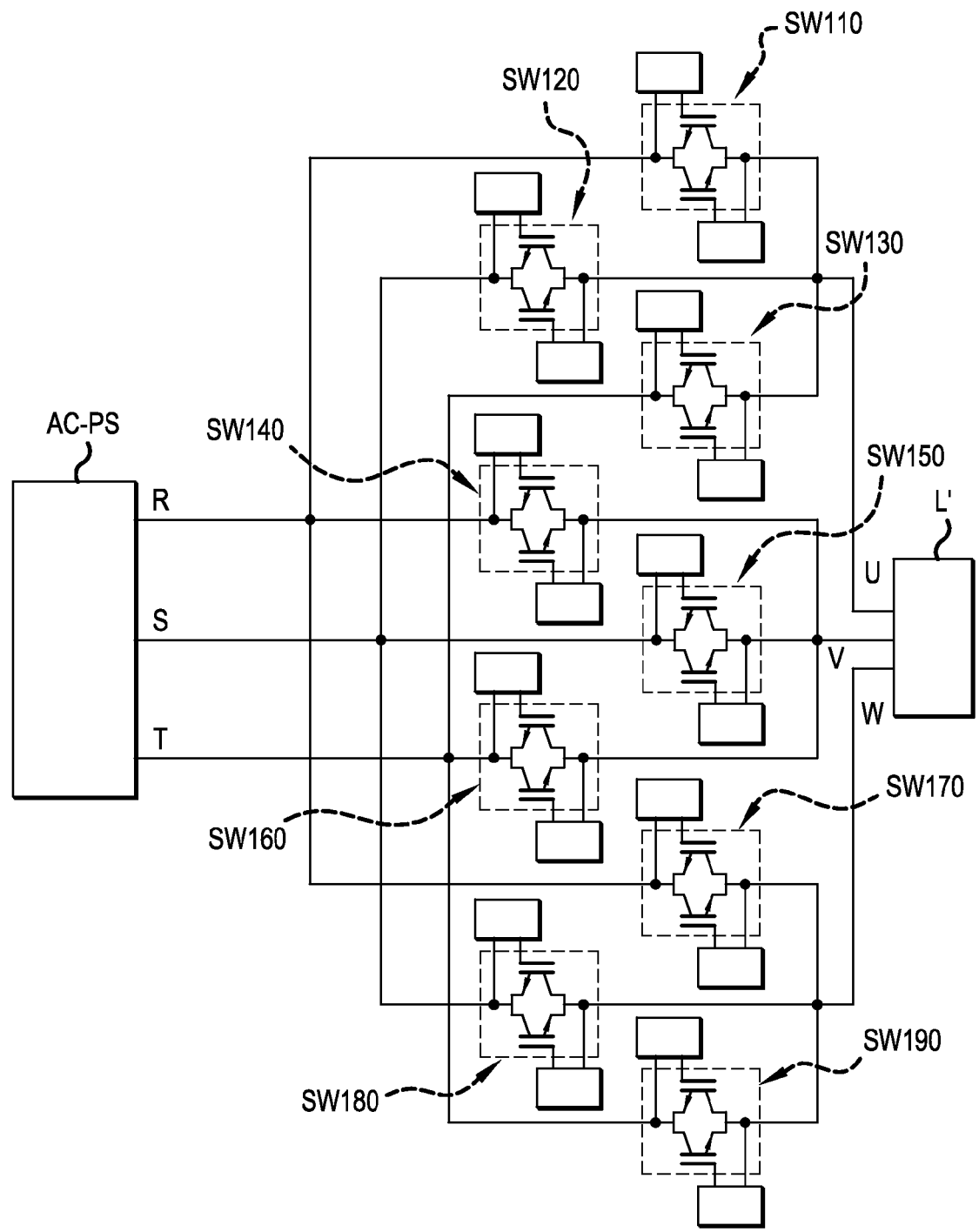
FIG. 18 is a circuit diagram showing a configuration example of a matrix converter according to the invention.

FIG. 18 is a circuit diagram showing a configuration example of a power conversion device according to an embodiment of the invention which is applied to a matrix converter. The power conversion device has a configuration wherein nine bidirectional switches SW110, SW120, SW130, SW140, SW150, SW160, SW170, SW180, and SW190 are connected between a three-phase alternating current power source AC-PS and a three-phase load L'.

In the power conversion device too, there is a case in which a reverse voltage is applied between the collectors and emitters of some of RB-IGBTs configuring the bidirectional switches SW110 to SW190. Therefore, an unshown control circuit, in order for gate on signals to be input into the gates of switch elements to which the reverse voltage is applied, outputs control signals which instruct gate drive circuits corresponding to the switch elements to turn on the gates of the switch elements. As a result of this, the switch elements to which the reverse voltage is applied are such that an increase in leakage current due to hole reinjection is suppressed, and a loss due to the increase in leakage current is reduced.

According to embodiments of the invention, as signals which turn on the gates are given to the gates of reverse-blocking insulated gate bipolar transistors in a condition in which a reverse voltage is applied between the collectors and emitters, an increase in leakage current accompanying the application of the reverse voltage is suppressed. As a result of this, it is possible to reduce a loss resulting from the leakage current, and thus improve the reliability of the reverse-blocking insulated gate bipolar transistors and the conversion efficiency of the power conversion device.

Also, as command signals for bringing the gates of the reverse-blocking insulated gate bipolar transistors, to which the reverse voltage is applied, into an on state are output from a control circuit, there is also the advantage of there being no need for means for detecting the reverse-blocking insulated gate bipolar transistors to which the reverse voltage is applied.

I claim:

1. A power conversion device comprising:
a bidirectional switch comprising two reverse-blocking insulated gate bipolar transistors, having reverse breakdown voltage characteristics, connected in reverse parallel, a configuration of the bidirectional switch being such that gate drive signals generated based on command signals output from a control circuit are given one to each of the two reverse-blocking insulated gate bipolar transistors, the control circuit being configured so as to output, as the command signals, a first command signal for bringing a gate of one of the two reverse-blocking insulated gate bipolar transistors, to which a reverse voltage is applied, into an on state while simultaneously outputting a second command signal that causes the other of the two reverse-blocking insulated gate bipolar transistors to turn on and off.

2. The power conversion device according to claim 1, wherein the power conversion device is configured to carry three or more levels of power conversions, and wherein one phase leg of the power conversion device includes:
a direct current power source having a positive electrode, a middle electrode, and a negative electrode;
a first semiconductor switch element to which a diode is connected in reverse parallel, a collector of the first semiconductor switch element being connected to the positive electrode of the direct current power source;
a second semiconductor switch element to which a diode is connected in reverse parallel, an emitter of the second semiconductor switch element being connected to the negative electrode of the direct current power source; and
the bidirectional switch, one end of which is connected to a connection point of an emitter of the first semiconductor switch element and a collector of the second semiconductor switch element, and the other end of which is connected to the middle electrode of the direct current power source.

3. The power conversion device according to claim 2, wherein the first and second semiconductor switch elements are insulated gate bipolar transistors.

4. The power conversion device according to claim 1, wherein
one phase leg of the power conversion device includes:
a direct current power source;
a first pair of bidirectional switches connected in series between a positive electrode and a negative electrode of the direct current power source; and
a second pair of bidirectional switches connected in series between the positive electrode and the negative electrode of the direct current power source.

5. The power conversion device according to claim 1, wherein
a plurality of bidirectional switches are connected so as to form a matrix converter.

6. A power conversion device comprising:
a first reverse-blocking insulated gate bipolar transistor configured to drive a load;
a second reverse-blocking insulated gate bipolar transistor connected in reverse parallel with the first reverse-blocking insulated gate bipolar transistor and configured to drive the load;
a first gate driver connected to the first reverse-blocking insulated gate bipolar transistor; and
a second gate driver connected to the second reverse-blocking insulated gate bipolar transistor,
wherein during a period in which the load is to be driven by the second reverse-blocking insulated gate bipolar transistor, the first gate driver is configured to provide, while a reverse voltage is applied to the first reverse-blocking insulated gate bipolar transistor, a signal to a gate of the first reverse-blocking insulated gate bipolar transistor to bring the gate into an on state while the second gate driver provides a signal to a gate of the second reverse-blocking insulated gate bipolar transistor to cause the second reverse-blocking insulated gate bipolar transistor to turn on and off, and
wherein during a period in which the load is to be driven by the first reverse-blocking insulated gate bipolar transistor, the second gate driver is configured to provide, while a reverse voltage is applied to the second reverse-blocking insulated gate bipolar transistor, a signal to the gate of the second reverse-blocking insulated gate bipolar transistor to bring the gate into an on state while the first gate driver provides a signal to the gate of the first reverse-blocking insulated gate bipolar transistor to cause the first reverse-blocking insulated gate bipolar transistor to turn on and off.

7. The power conversion device according to claim 6, further comprising a control circuit,
wherein the first and second gate drivers provide the signals to the gates in response to respective command signals from the control circuit.

* * * * *